(12) United States Patent
van de Vorst et al.

(10) Patent No.: US 6,494,131 B2
(45) Date of Patent: *Dec. 17, 2002

(54) TREATMENT DEVICE FOR TREATING FOOD PRODUCTS WITH CONDITIONED AIR

(75) Inventors: Henricus J. A. van de Vorst, Drunen (NL); Henricus F. J. M. van der Eerden, Gemert (NL)

(73) Assignee: Stork Titan B.V., Boxmeer (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/862,969

(22) Filed: May 22, 2001

(65) Prior Publication Data

US 2002/0029698 A1 Mar. 14, 2002

Related U.S. Application Data

(63) Continuation of application No. 09/300,211, filed on Apr. 27, 1999, now Pat. No. 6,244,168.

(30) Foreign Application Priority Data

Apr. 28, 1998 (NL) .............................................. 1009020
Feb. 2, 1999 (NL) .............................................. 1011199

(51) Int. Cl.[7] .............................................. A47J 37/00
(52) U.S. Cl. .......................... 99/443 C; 99/476; 99/479

(58) Field of Search ........................... 99/352–355, 361, 99/362, 443 C, 494, 476, 477–479, 473; 126/21 A

(56) References Cited

U.S. PATENT DOCUMENTS 6,244,168 B1 * 6/2001 Van De Vorst et al. ... 99/443 C

* cited by examiner

Primary Examiner—Timothy F. Simone
(74) Attorney, Agent, or Firm—Stroock & Stroock & Lavan LLP

(57) ABSTRACT

A treatment device for subjecting food products to a temperature treatment comprises a housing, at least one conveyor, on which the food products can be conveyed along a helical conveying path, as well as air-circulation throughout the treatment device sufficient for causing conditioned air to circulate through the device, an air-conditioning device, in which device, according to the invention, air-distribution device that will allow for distributing the conditioned air via only part of the inside of the helical conveying path are provided on the inside of the conveying belt, which air-distribution device that will be connected to the air-circulation portion of the treatment device. In the device according to the invention, the conditioned air is blown over the products from a limited open area of the air-distribution device on the inside of the helical conveying path.

20 Claims, 2 Drawing Sheets

TREATMENT DEVICE FOR TREATING FOOD PRODUCTS WITH CONDITIONED AIR

REFERENCE TO RELATED APPLICATIONS

This application is a continuation of U.S. application Ser. No. 09/300,211, filed Apr. 27, 1999, now U.S. Pat. No. 6,244,168.

TECHNICAL FIELD

The invention relates to a treatment device for treating food products with conditioned air, comprising a housing, at least one conveyor means for conveying the products through the housing along a helical conveying path, air-circulation means for causing a flow of air to flow through the housing, as well as air-conditioning means for conditioning the flow of air.

DESCRIPTION OF THE PRIOR ART

A treatment device of this nature, in the form of a climate chamber, is known from EP-B-0 333 565. This known device comprises a housing containing a helical conveyor belt which can move around the axis of the spiral, means for causing a conditioned gas or vapour to circulate inside the housing and around each product which is situated on the conveyor belt, first and second support means being provided in order to support the inner and outer edges, respectively, of the conveyor belt. In an embodiment of this known device, a circulation of air is generated in the housing, with conditioned air being blown onto the conveyor belt from the entire circumference of the drum around which the conveyor belt is moving, which conditioned air is then sucked in next to the conveyor belt and, following conditioning in the air-conditioning means, is blown back into the drum. In another embodiment of this device, the air is directed, by means of suitable baffle plates, towards a limited air-inlet area on the outside of a helical conveyor, from where the air flows horizontally over the conveyor belt, and the air is split into two and is removed on the other side opposite the air-inlet area. In further embodiments—aiming to reduce the pressure drop across the device and to improve the heat transfer —the air, after it has been guided over the conveyor belt, leaves the helical conveyor at one or both of its axial ends. In this case, the air may be guided over the products either from the inside or from the outside of the conveyor belt, after which the air flows through the turns of the conveyor belt towards one or both axial ends.

It should be noted that in this description (helical) conveyor is understood to mean the assembly of a central column or shaft and the conveyor means which is guided around it along a helical path, as well as the associated support means for supporting the conveyor means.

Furthermore, EP-A-0 804 878 has disclosed a furnace for preparing food products which comprises a housing as well as a helical conveyor which is disposed therein and on which the food products can be accomodated, as well as heating means and so-called "booster" means for generating a flow of hot air through the housing with a view to heating the food products which lie on the belt. In this housing, guide means for guiding the flow of hot air over the conveyor belt are disposed in such a manner that the products are heated uniformly in the transverse direction of the belt. According to the embodiment described in this European Patent application, air is blown onto the food products on the conveyor belt from the outside. A number of features are provided for guiding and directing the flow of hot air, which features are disposed on the outside of the helical conveyor and between the turns of the latter.

One of the drawbacks of this known device is that the conditioned air flows along the inside of the wall of the housing of the oven, which wall forms a large heat-exchanging surface with the environment, resulting in the loss of energy before the flow of hot air is directed onto the products in order to subject them to a temperature treatment. A further drawback is that the hot air is guided over the products from the outside of the conveyor belt, where the product density on the conveyor belt is less than on the inside of the conveyor belt, so that the highest intensity of heat is available at a location where there is no need for this intensity to be so high. It is thus impossible for a uniform temperature treatment to take place. The guide means, which extend between the turns, in addition give rise to an accumulation of contamination, such as fat and the like in the case of meat products, for example, which cannot easily be removed owing to the limited accessibility of the helical conveyor which is caused by these guide means being present between the turns. Also, the presence of the guide means on the outside of the helical conveyor interferes with a compact structure of the device. Furthermore, two so-called "booster means" per spiral are required to obtain any form of controlled air flow. The devices known to date are designed in such a way as to subject all types of products to a temperature treatment which is virtually identical for each type of product, possibly designed with different compartments for different temperatures. However, each type of product requires specific preparation conditions, such as time-dependent temperature, air flow and moisture conditions, which are connected with the microstructure of the product type. For example, the heating of the inside of a product in order to bring about the desired change in proteins and flavourings is different for each type of product. For example, a fatty product transmits temperature from its outside to its inside differently from a product with little fat. Consequently, different treatments would be required for optimum preparation of different types of products. The shape of a product also plays a role in this context. However, in practice, the starting point is average conditions for all types of product together, so that it is not possible to achieve optimum preparation which is oriented to a specific type of product.

OBJECTS OF THE INVENTION

One object of the present invention is to provide a treatment device for treating food products, in particular meat products with conditioned air, which device does not present the abovementioned drawbacks, or presents them to a lesser extent.

More particularly, one object of the invention is to provide a device of this nature in which conditioned air is brought into contact with the products to be treated in a controlled manner in order to create conditions which are adapted to the product.

A further object of the invention is to provide a device of this nature in which energy loss to the environment is considerably reduced.

Yet another object is to reduce environmental pollution caused by the device.

A further object of the invention is to provide a device of this nature which is easily accessible for cleaning and/or maintenance work, while the device still has a compact structure and thus takes up little space.

A further object of the invention is to provide a device in which various preparation methods can be combined, in particular a treatment device in which a treatment with steam is followed by a different preparation method, such as cooking or grilling.

SUMMARY OF THE INVENTION

The treatment device according to the invention of the type mentioned above is, to this end, characterized in that air-distribution means for distributing the flow of air via only part of the inside of the helical conveying path are disposed on the inside of the helical conveying path, which air-distribution means are connected to the said air-circulation means.

In the device according to the invention, conditioned air is fed to air-distribution means which are disposed in the helical column and which are designed to distribute the flow of conditioned air over the turns of the helical conveyor via a limited inlet area. Blowing the air in centrally via the air-distribution means reduces the energy losses, since the heat is transferred directly to the products which are to be treated. Furthermore, the product density on the conveyor belt directly adjacent to the central column is greater than on the outer edge, so that blowing hot air onto the products on the inside provides the highest energy intensity at the location where this is required. In order to enable the treatment conditions for each product to be as uniform as possible, the air is made to flow out over the turns of the helical conveyor from only a part of the inside of the helical conveying path. The air which has been distributed into layers then flows partially in cocurrent and partially in countercurrent over the turns of the helical conveyor. The nature of the conveyor belt is such that the flow of air through the belt is relatively low compared to the flow of air which passes over the belt in cocurrent and countercurrent. This directed flow is, in addition to the only partially open air-distribution means, also controlled by the air-circulation means which suck the air in and then send it to the air-conditioning means. The layered distribution makes it possible to control the conditions around each product at any desired time and any desired location, so that a product-specific treatment can be carried out. In principle, the intensity, i.e. volume, velocity and/or the temperature of the conditioned air can be controlled for each turn.

It should be noted that in the present application, the term conditioned air is understood to mean air whose temperature and/or moisture content and/or velocity/volume is controlled. A high air velocity or air volume in combination with a high temperature provides the possibility of rapidly searing the surface of a product. Furthermore, the temperature is important for cooking products, while the air humidity is important in connection with products being dried out in a warm environment. Air to which steam is added may also be used as the treatment medium. In this case, the air-conditioning means comprise, for example, one or more steam nozzles which are connected to a steam generator or the like. Treatment processes in which these parameters play a role include, inter alia, cooking, precooking, steaming, grilling and baking/frying of food products, in particular meat products, which are prepared ready to eat. Other processes include drying, cooling and freezing.

The treatment device can be controlled using fuzzy logic, in order for it to be possible to carry out the treatment in the optimum possible way with regard to specific product preparation conditions and energy loss.

With a view to further reducing the energy loss, the housing may be in the form of a cylinder which substantially corresponds to the outer circumference of the helical conveyor.

BRIEF DESCRIPTION OF THE DRAWING

The treatment device according to the invention is explained below with reference to the appended drawing, in which.

DESCRIPTION OF THE PREFERRED EMBODIMENTS

Figure 1:
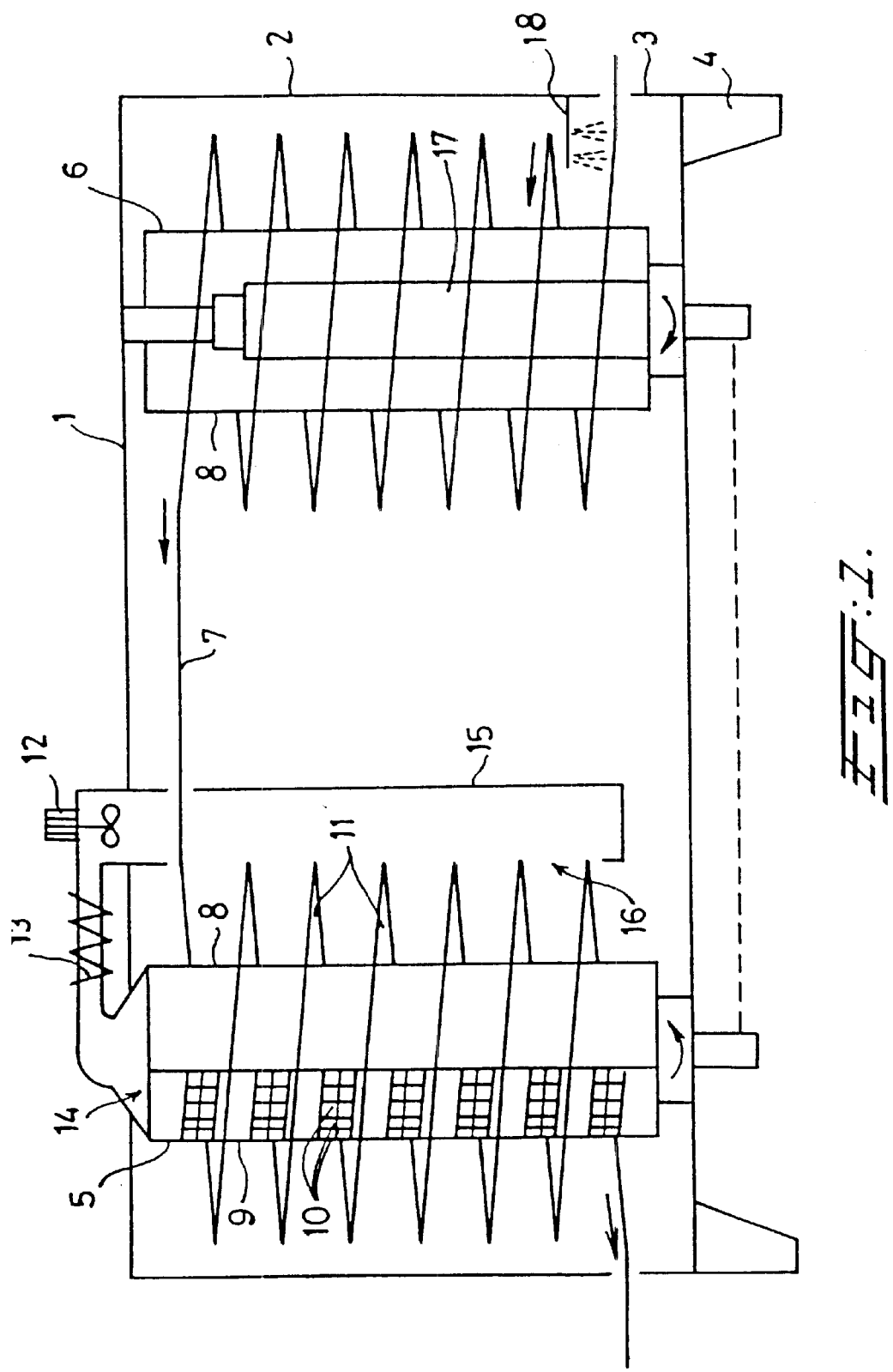
FIG. 1 shows a diagrammatic view of an embodiment of a treatment device according to the invention.

In order to distribute the air over the turns of the helical conveyor, the air-distribution means preferably comprise an air-distribution duct which is provided with at least one air-outlet opening over only part of its circumference. If the air-distribution duct comprises only one air-outlet opening, this opening generally consists of an elongate, vertical opening which substantially corresponds to the overall height of the turns of the helical conveyor.

According to a preferred embodiment, the air-distribution means comprise a pattern of air-outlet openings which are delimited by vertical and virtually horizontal strips. Advantageously, the horizontal strips run parallel to the conveyor means.

Advantageously, the shape and/or size of the air-outlet opening or openings is adjustable, so that the device is suitable for treating different types of product and/or for using different conditions and the specific preparation conditions can be adjusted.

In order to guide the flow of conditioned air in the air-distribution means correctly, the air inlet to the air-distribution means and the air-outlet openings thereof are positioned substantially diametrically opposite one another. In this way, the cocurrent and countercurrent flow of air over the conveyor belt is improved further, and therefore so are the options for controlling the preparation conditions for each turn.

For the same purpose, the air-outlet openings of the air-distribution means, which distribute the air in layers over the helical conveyor, are positioned substantially diametrically opposite an air feed to the air-circulation means. According to a further embodiment, this air feed to the air-circulation means comprises an air duct which is disposed beneath the air-circulation means and has a side which is open towards the helical conveyor. In order to ensure that the air moves across the belt, this air feed to the air-circulation means is preferably disposed on the outside of the helical conveyor.

Advantageously, heating means are disposed in the air-distribution duct itself. These heating means may, for example, comprise a heat exchanger which is fed with steam.

In this embodiment, the heating means are furthermore advantageously heating elements which are disposed on either side of the vertical plane through the centre of the air inlet and the centre of a helical conveyor, thus ensuring that the air supplied flows via these heating elements and is thus heated. If desired, these heating elements can be controlled separately, providing the option of creating at least two different environments per turn.

In order to adjust the volume of hot air which is fed to a specific turn of the helical conveyor from the air-distribution duct, volume-adjustment means for adjusting the volume of air which is fed to a turn of the helical conveying path are preferably provided. These adjustment means may comprise flow-resistance means which are disposed in the air-distribution duct.

In a similar way, the temperature of the volume of air fed to a turn can be controlled with the aid of temperature-control means.

Furthermore, the treatment device according to the invention advantageously comprises means for adjusting the air humidity. It has been found that adding moisture to the products at the start of the treatment improves the quality of the products treated. This is because a moist product is better able to absorb heat than a dry product. In addition to means for adjusting the air humidity, it is also possible to use means for directly wetting the products. If wetting means of this nature, for example means for spraying or sprinkling water or steam onto the products to be treated, are disposed at the first turn of the conveyor belt, the product is wetted just before it is seared by the heat supplied. The absorbed moisture improves the heat transfer and after the product has been seared this moisture can no longer evaporate from the product and therefore is retained in the product. On the other hand, when grilling, a reduced air humidity often has a beneficial effect on the quality of the food products.

Advantageously, the treatment device according to the invention comprises at least two helical conveyors which are each provided with air-conditioning means as described above. Preferably, in the first helical conveyor the conveyor belt is guided upwards and then crosses over to the second helical conveyor, which is then guided downwards.

A device of this nature, which is often divided into two or more compartments, allows different preparation methods to be carried out in succession in a single device. For example, food products can firstly be steamed using steam-containing air and then subjected to a surface treatment at high temperature, such as cooking or grilling, with the aid of hot air. During the steaming, the entire product is heated intensely, while during the grilling a crust is formed on the outside.

A combination of different preparation methods of this nature can be carried out in each treatment device for treating food products with conditioned air and is not limited to the treatment device defined above.

The invention therefore also relates to a treatment device for treating food products with conditioned air, comprising a housing which contains at least two adjacent treatment zones, each zone comprising a helical conveying path and each zone being provided with its own air-conditioning means, as well as at least one conveyor means for conveying the products along the helical conveying paths, and air-circulation means for causing a flow of air to flow through the housing, the air-conditioning means comprising, in the first zone, steam-feed means for adding steam to air, and the air-conditioning means in at least one following zone comprising heating means. Preferably, the zones are separated by a partition with a passage for a conveyor means. The heating means which, as described, are present in a later zone are preferably designed to cook or grill the food products which have already been steamed in a previous zone.

In view of the space available, the air-circulation means are advantageously disposed in the top space between two conveyors and the housing. If the treatment device according to the invention is provided with two helical conveyors, these conveyors are preferably driven synchronously.

In order to improve the general accessibility of a treatment device containing a helical conveyor, the housing of this device may comprise a hood which can be moved up and down and is attached to lifting means, for example a telescopic arm, which are disposed in the central column of the helical conveyor. If a structure of this nature is used, there is no need for additional space for lifting arms or hoist arms, for example, above the device, thereby limiting the construction height of the device to a lesser extent. Advantageously, the telescopic arm is driven by a spindle. A structure of this nature can be used for any treatment device with a helical conveyor or helical conveyors and is not limited to the treatment device according to the invention.

Furthermore, if a structure of this nature is used in the treatment device according to the invention described above, the air-circulation means, air-conditioning means and air-distribution means are advantageously attached to the hood. In that case, when the hood is lifted, only the drive, the central spiral column, of the conveyor belt and the conveyor belt itself remain in position, so that the latter is easily accessible for cleaning and maintenance work, if required.

In FIG. 1, reference number 1 denotes the housing of a treatment device according to the invention. This treatment device may, for example, be used for the cooking, steaming, precooking, grilling and baking/ frying, and similar treatments, of food products, such as sausages and the like. In particular, the treatment device is suitable for preparing fully prepared meat products which then only have to be heated by the end user. The housing 1 comprises a hood 2 which can move up and down and a trough 3 which rests on legs 4. This trough 3 serves to collect fat and the like which drips down. Two helical conveyors 5 and 6, along which an endless conveyor belt 7 is guided along a helical path, are disposed in the housing 1. Each helical conveyor comprises a central cylindrical column 8 which comprises interconnected vertical pillars, is disposed so that it can rotate and, with the aid of means which are not shown, can rotate in the direction indicated by the arrows. The conveyor belt 7 is driven frictionally by the rotating column 8. In each column 8, there is an air-distribution duct 9, only part of whose circumference is provided with air-outlet openings 10, which are illustrated only in the left-hand helical conveyor. The air-distribution duct 9 ensures that the conditioned air is distributed in layers over the turns 11 of the conveyor belt. By means of a fan 12, the conditioned air is made to circulate through the device, the conditioning taking place in a heat exchanger 13 which in the situation illustrated in FIG. 1 is disposed between the ventilator 12 and air inlet 14 of the air distribution duct 9. The air which flows out of the air-outlet openings 10 of the air-distribution duct 9 is divided by the housing 1 and then passes in cocurrent and countercurrent over the conveyor belt and is fed back to the fan 12 via an air duct 15 which has one side 16 which is 30 open towards the conveyor belt. As has already been stated above, the temperature of air fed to the turns of a helical conveyor may be equal for all the turns, while the heat intensity of the air for each turn is controlled by adjusting the volume or velocity of air, for example by varying the dimensions of the air-outlet openings 10 for each turn.

Each air-distribution duct 9 contains a lifting-cylinder assembly 17, for example a telescopic arm which is driven by a spindle, which assembly is shown only in the right-hand part of FIG. 1 and is able to move the hood 2, together with the components of the device which are fixed to it, namely air-distribution duct 9, fan 12, heat exchanger 13, air inlet 14 and air-discharge duct 15, up and down. This makes the conveyor belt 7 and the central drive column 8 readily accessible for cleaning and maintenance work.

While the endless conveyor belt is being guided back— preferably beneath the bottom of the helical conveyors—the belt can be cleaned, for example by washing with hot water, so that the heat content of the belt is not lost. Moreover, hot water is more suitable for soaking off and removing any dirt on the belt. The cleaned belt can then be dried with hot air.

If desired, it is possible to arrange, for example, sprinkler heads 18 in the housing 1, in order to adjust the air humidity inside the device.

Figure 2:
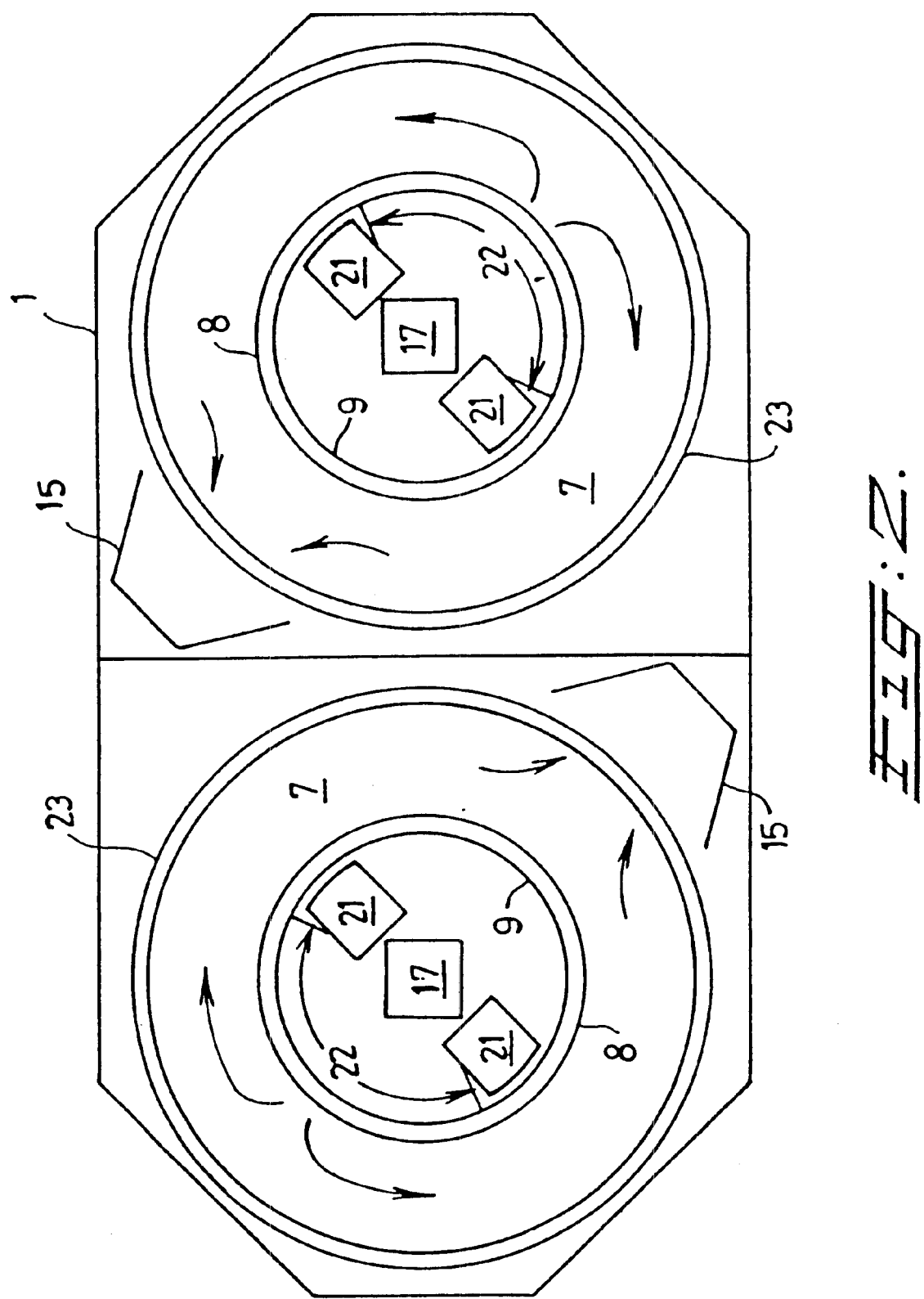
FIG. 2 shows a diagrammatic cross section through an embodiment of the treatment device according to the invention.

Advantageously, the heating means 21 are disposed in the air-distribution duct 9 itself, as illustrated in the cross-section shown in FIG. 2. In that figure, identical components are provided with identical reference numerals. The air is forced to pass through the heat exchangers 21 before the air flows out. The direction of flow of the air is indicated by arrows. Reference numeral 22 denotes that part of the circumference of the air-distribution duct 9 which is provided with outlet openings. The conveyor belt 7 is supported in a manner known per se by means of support means 23. As can be seen from FIG. 2, the air outlet, together with the fan situated above it, is disposed in the space between the helical conveyors 2, 3 and the housing 1. This ensures optimum utilization of space.

The treatment device according to the invention discussed above can be used advantageously for steaming the food products when they are being guided upwards on the conveyor belt 7 along the helical conveyor 6, steam sprinklers being disposed upstream of the air inlet 14 of an air-distribution duct 9 or in the air-distribution duct 9 itself, while after the food products have crossed over to the second conveyor 5, they are subjected to a treatment at high temperature when they are moving downwards, by means of air which has been conditioned with heating means, such as 21.

What is claimed is:

1. A treatment device for treating food products with conditioned air comprising:
    a housing;
    at least one conveyor means conveying food products through said housing along a helical conveying path, said conveyor means comprising a conveyor belt and a central column for supporting said conveyor belt, said central column defining an interior portion;
    air circulation means in fluid connection with the central column for causing a flow of air to flow into said interior portion of said column;
    air conditioning means in fluid connection with said air circulation means for conditioning the flow of air; and
    air distribution means in fluid connection with said air conditioning means for distributing the flow of air from only a part of the said interior portion of said column to the helical conveying path.

2. Treatment device according to claim 1, wherein the air-distribution means comprise an air-distribution duct which is provided with at least one air-outlet opening over only a part of its circumference.

3. Treatment device according to claim 2, wherein the shape and/or size of the at least one air-outlet opening is adjustable.

4. Treatment device according to claim 1, wherein the air-distribution means comprise a pattern of air-outlet openings which are delimited by vertical and virtually horizontal strips, which horizontal strips preferably run virtually parallel to the conveyor means.

5. Treatment device according to claim 1, wherein the air inlet to the air-distribution means and the at least one air-outlet opening thereof lie substantially diametrically opposite one another.

6. Treatment device according to claim 1, wherein the at least one air-outlet opening lies substantially diametrically opposite an air feed to the air-circulation means.

7. Treatment device according to claim 6, wherein the said air feed comprises an air duct which is disposed beneath the air-circulation means and has a side which is open towards the conveyor means.

8. Treatment device according to claim 6, wherein the air feed is disposed on the outside of the conveyor means.

9. Treatment device according to claim 1, wherein heating means are disposed in the air-distribution means.

10. Treatment device according to claim 9, wherein the heating means comprise heating elements which are disposed on either side of the vertical plane through the air inlet and the centre of a helical conveyor.

11. Treatment device according to claim 1, wherein volume-adjustment means for adjusting the volume of air fed to a turn of the helical conveying path are provided.

12. Treatment device according to claim 11, wherein the volume-adjustment means comprise flow-resistance means which are disposed in the air-distribution means.

13. Treatment device according to claim 1, wherein temperature-control means for controlling the temperature of air fed to a turn of the helical conveying path are provided.

14. Treatment device according to claim 1, wherein means for adjusting the air humidity are provided.

15. Treatment device according to claim 1, wherein the treatment device comprises at least two helical conveyors.

16. Treatment device according to claim 15, wherein the air feed to the air-circulation means is disposed in the space between two conveyors and the housing.

17. Treatment device according to claim 15, wherein the helical conveyors are driven synchronously.

18. A treatment device for treating food products with conditioned air comprising:
    a housing;
    at least one conveyor means for conveying food products through said housing along a helical conveying path, said conveyor means comprising a conveyor belt and a central column for supporting said conveyor belt, said central column defining an interior portion;
    air circulation means for causing a flow of air to flow through the interior of the housing;
    air conditioning means in fluid connection with said air circulation means for conditioning the flow of air;
    wherein the housing comprises a hood connected to a lifting device for moving the hood up and down, which lifting device is disposed in said interior portion of said central column.

19. A treatment device for treating food products with conditioned air comprising:
    a housing including at least two adjacent treatment zones, each zone comprising a conveyor means for conveying food products through said housing along a helical conveying path and each zone provided with means for conditioning air, said conveyor means comprising a conveyor belt, air circulation means for causing a flow of air to flow through the interior of the housing;
    air conditioning means in fluid connection with said air circulation means for conditioning the flow of air, said conditioning means comprising in the first zone means for feeding steam and in an adjacent zone, means for heating.

20. Treatment device for treating food products with conditioned air comprising:
- a housing comprising a hood connected to a lifting device for moving the hood up and down;
- at least one conveyor means for conveying food products through said housing along a helical conveying path, said conveyor means comprising a conveyor belt and a central column for supporting said conveyor belt, said central column defining an interior portion, said lifting device being disposed in said central column;
- air circulation means in fluid connection with the central column for causing a flow of air to flow into said interior portion of said column;
- air conditioning means in fluid connection with said air circulation means for conditioning the flow of air; and
- air distribution means in fluid connection with said air conditioning means for distributing the flow of air from a part of said interior portion of said column to the helical conveying path.

* * * * *